United States Patent Office 3,320,493
Patented May 16, 1967

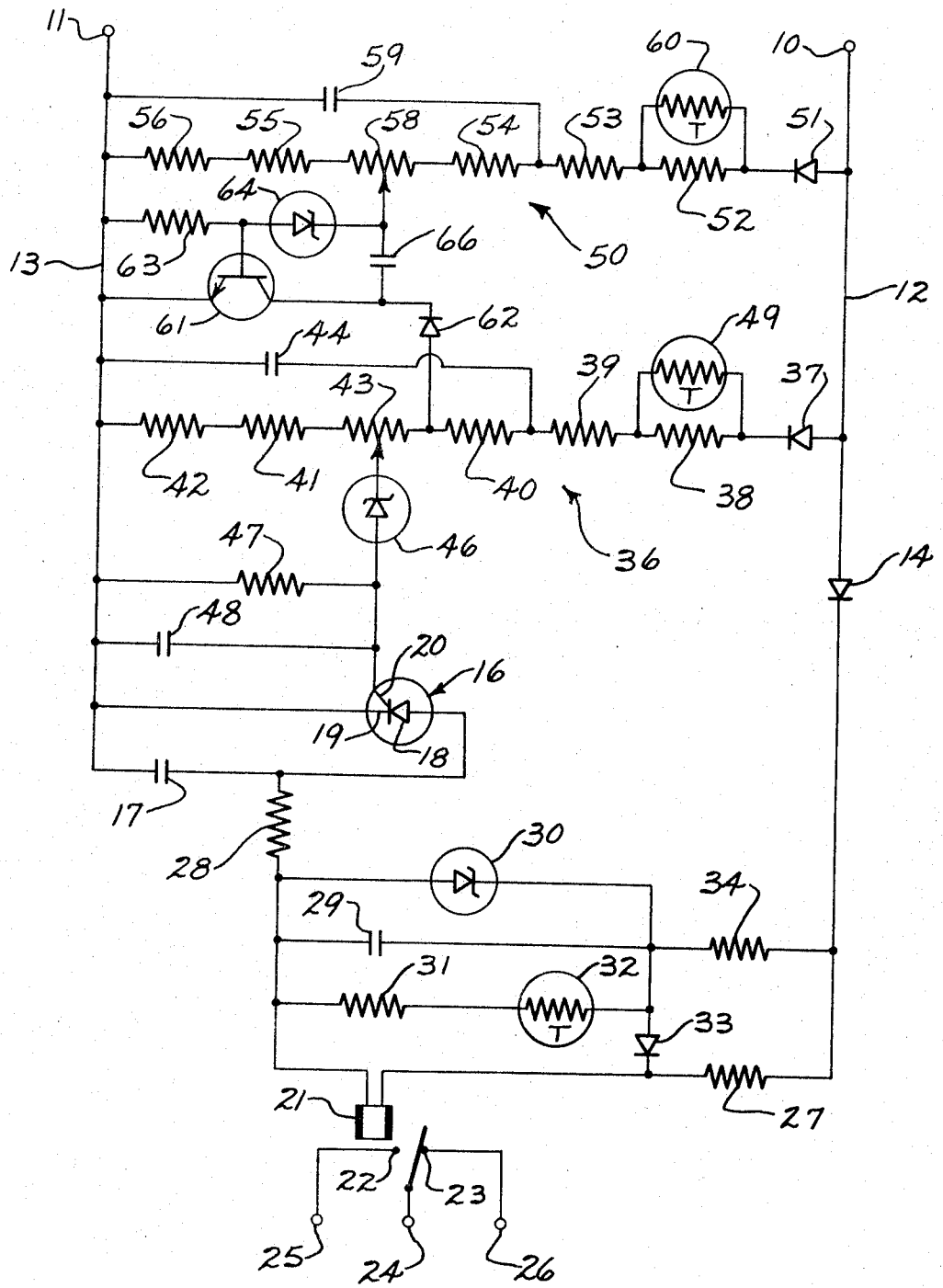

3,320,493
VOLTAGE SENSOR
George T. Culbertson, Inglewood, Calif., assignor, by mesne assignments, to Master Specialties Company, Gardena, Calif., a corporation of California
Filed Jan. 22, 1964, Ser. No. 339,514
8 Claims. (Cl. 317—148.5)

This invention relates in general to voltage sensors and more specifically to voltage sensors in which an upper and a lower voltage limit may be set to establish the bounds of system tolerance.

In electrical system operations, an increased reliance is being placed upon various indicator devices which monitor the condition of parts of the system. Although every effort is made to present a fail-safe indication, proper operation is *nearly* always dependent upon a proper level of source voltage. The source may be a 400-cycle generator of an aircraft system and it is imperative that an indication be given when the source has failed completely, or when its voltage is outside of established limits to enable proper procedures for correction. The indicator must be such that the operator is not compelled to rely upon other indicators which may be faulty when receiving improper voltages. Accordingly, a principal object of this invention is to provide an extremely reliable and rugged device for detecting and indicating when the voltage of a source of supply fails or falls outside of a predetermined range.

A further object of the present invention is to provide a solid state circuit which may be readily packaged and which controls the energization of a relay whose contacts may be included in an indicating load circuit.

Another object of the present invention is to provide a novel voltage sensor including a controlled rectifier which senses an alternating current supply and which has a diode in the anode to cathode circuit of the controlled rectifier to enable detection of the magnitude of supply voltage during each cycle of operation of the supply.

A further object of the present invention is to provide a voltage sensor in which there is an accurately timed delay drop-out for the circuit sensing relay which precludes the giving of a false indication as a result of a momentary line voltage variation.

Still another object of the present invention is to provide a suitable voltage sensor which has adjustable upper and lower voltage limits for relay drop-out and which will operate with high accuracy over a wide temperature range.

The triggered device of the present invention is a controlled rectifier or controlled switch which is a solid state counterpart of a gas-filled thyratron tube. Like the thyratron, the controlled rectifier remains in a conducting condition once it has been fired even though the triggering signal is removed. In order to turn the device off, it is necessary to reduce the anode to cathode potential to a few tenths of a volt. In the case of the present invention, the alternating current supply is half-wave rectified and is applied to the anode to cathode of the controlled rectifier to turn on when the supply voltage is within a set or predetermined operating range. The triggering voltage is removed when the voltage falls outside its predetermined range and the controlled rectifier is permitted to turn off. A relay is provided which pulls in when the controlled rectifier fires and is arranged to drop out only after a predetermined time delay following the turn-off of the controlled rectifier.

The foregoing and other objects, features and advantages of the invention will be apparent from the following description of a preferred embodiment of the invention illustrated in the accompanying drawing.

The circuit shown in the drawing includes an alternating current source which, in the illustrated embodiment, may be nominally 115 volts and have a nominal frequency of 400 cycles per second. The source is connected to terminals 10 and 11 to extend to the remaining circuit along lines 12 and 13. The source is half-wave rectified by semi-conductor diode 14 arranged to provide a positive voltage to the anode 18 of a controlled rectifier 16, the function of which is analogous to a switch in the circuit of the present invention. A capacitor 17, connected from anode 18 to cathode 19 of the controlled rectifier or switch 16, is permitted to charge through the diode 14 during the positive half cycles of the supply and serves to prevent sudden line voltage changes and transients from inadvertently triggering the controlled rectifier 16.

An output sensing relay 21 has normally open contacts 22 and normally closed contacts 23 connected in common to an output terminal 24 with individual opposite terminals 25 and 26, respectively. It is understood that the entire circuit may be mounted in a rugged assembly having as available terminals the inputs 10 and 11 as well as the outputs 24–26 for connection to an appropriate load. The coil of relay 21 is connected in the circuit through resistors 27 and 28 between the diode 14 and the anode 18 of the controlled rectifier 16 so that it receives nearly full line voltage when the controlled rectifier 16 fires.

A capacitor 29 is provided which is responsible for a delayed drop-out of the relay 21. The capacitor receives a fixed voltage charge from a zener diode 30 connected in parallel with a resistor 31 and a temperature regulating thermistor 32. This parallel combination is also connected across the relay coil 21 through a semi-conductor diode 33 and is joined to the supply line diode 14 through a resistor 34.

A low voltage limit circuit for the rectifier 16 is used which preferably includes a voltage divider 36 from supply lines 12 and 13. The voltage divider circuit includes a rectifier 37 poled in the same sense as the supply line rectifier 14, resistors 38–42, and a potentiometer 43. The resistors 38–42 are chosen to provide a desired range of adjustment for the potentiometer 43 to enable the controlled rectifier 16 to be fired when the supply voltage is above a selected low limit and to become turned off when the supply voltage falls below the selected low limit. The controlled rectifier or switch 16 turns off when the plate to cathode voltage falls below the voltage required to sustain conduction in the controlled rectifier. Since the supply voltage is an alternating current of conventional frequency and since the controlled rectifier 16 is able to alter its conduction state in less than one microsecond, the gate electrode 20 is capable of monitoring the selected low voltage limit during each cycle of supply voltage.

The voltage sensed by potentiometer 43 is regulated and smoothed by a capacitor 44 connected from the junction between resistors 39 and 40 to supply line 13. The control voltage applied to gate electrode 20 of the controlled rectified is established by a zener diode 46 connected between the adjustable tap of potentiometer 43 and the gate electrode 20. When the voltage at the tap is sufficiently high to exceed the zener voltage of diode 46, a positive triggering voltage is available at gate electrode 20 due to the voltage drop across a resistor 47 connected from gate electrode 20 to supply line 13 and paralleled by a capacitor 48. This voltage is stabilized in operation by the charge on capacitor 48. If desired, temperature compensation may be provided by a thermistor 49 paralleling the resistor 38 in the low limit voltage divider 36.

The high voltage limit circuit includes a voltage divider 50 from supply lines 12 to 13 including a rectifier 51 poled in the same sense as rectifier 37 and supply line rectifier 14, a number of resistors 52–56, and a potentiometer 58. The potentiometer 58 is adjusted to enable the controlled rectifier 16 to be fired when the voltage supply is below a selected high limit and to be turned off when the voltage supply rises above the selected high limit. Regulation is provided by a smoothing capacitor 59 connected from supply line 13 to the junction between resistors 53 and 54. Temperature compensation can be added, if desired, by a thermistor 60 connected across resistor 52.

The controlled element for the high limit of sensed voltage is an NPN transistor 61 connected in common emitter fashion with its collector connected to the upper end of the potentiometer 43 through a diode 62. The base of transistor 61 receives a saturation-causing signal from the junction between a resistor 63 and a zener diode 64 whose other end is connected to the tap of potentiometer 58. Capacitor 66 charges to nearly the voltage of the tap of potentiometer 58 when transistor 61 turns on and provides regulation. The zener diode 64 enables operation of transistor 61 when the voltage at potentiometer 58 exceeds its zener breakdown of voltage. When the transistor 61 conducts, it places the upper end of potentiometer 43 at nearly the voltage of supply line 13 due to the small voltage drop across diode 62 and emitter-to-collector of transistor 61.

For an operating example, an A.C. supply is connected to terminals 10 and 11 having a magnitude of 115 volts. The voltage dividers 50 and 36 may have their potentiometers 58 and 43 set within an adjustable range of 114–124 volts for the upper limit and 106–116 volts for the lower limit of sensing. If the supply voltage is within the set high and low limit range, zener diode 46 will exceed its zener breakdown voltage and will provide a positive firing voltage across capacitor 48 at the gate 20 of controlled rectifier 16. When the controlled rectifier 16 fires, it becomes a very low impedance in series with relay 21 enabling a large portion of the line voltage to be placed across the relay causing it to pull in.

The zener diode 30 stabilizes the voltage across the capacitor 29 to provide an accurate time delay for relay drop out after controlled rectifier 16 turns off. The discharge path for capacitor 29 is through diode 33 and relay 21 as well as the parallel path through resistor 31 and thermistor 32. The characteristics of relay 21 may be chosen to cause the relay to drop out in 0.5 second after controlled rectifier 16 turns off. This delayed drop out feature will avoid an erroneous indication or disconnection due to a momentary failure of the power supply voltage to stay within its operating range.

Should the source voltage drop below its low limit, there would be insufficient voltage at gate 20 to fire controlled rectifier 16. Capacitor 17 would simply charge preparatory to a subsequent firing. After the drop out control capacitor 29 discharges sufficiently, relay 21 drops out to control the load circuit connected to its contact sets 22 and 23 through leads 24, 25 and 26.

If the supply voltage exceeds its high limit, the voltage at the tap of potentiometer 58 becomes sufficiently high to cause zener diode 64 to enter its zener breakdown region causing a positive current at the base of transistor 61. Transistor 61 saturates, providing a nearly zero resistance from the upper end of potentiometer 43, through diode 62 to line 13. When this occurs, there is insufficient voltage across zener diode 46 to permit a suitable firing potential at gate 20. The controlled rectifier 16 thereby turns off and remains off until the supply voltage is re-established within its operating range. The RC time constants of the high limit voltage divider circuit are chosen to avoid misoperation due to transient voltage changes. The stabilization of the circuit is such that the accuracy of the voltage sensor may be approximately 1%.

While the invention has been disclosed in conjunction with a specific arrangement of the circuit components, it will be apparent to those skilled in the art that numerous modifications and changes may be made without departing from the scope of the appended claims.

What I claim is:

1. A voltage sensing and indicating circuit for detecting and indicating when the voltage of a monitored signal exceeds a predetermined maximum or minimum level, said circuit comprising, in combination,
 a pair of input terminals for connection to the source of such monitored signal,
 a controlled rectifier having anode, cathode and gate electrodes,
 a normally conducting, voltage responsive switch means operatively connected to said gate of said controlled rectifier with said controlled rectifier biased such that it conducts when said voltage responsive switch means is conducting,
 a first voltage divider network connected across said input terminals and operatively connected to said voltage responsive switch means whereby said voltage responsive switch means remains conductive so long as the voltage of said monitored signal exceeds such predetermined minimum level,
 a second voltage divider network connected across said input terminals and operatively connected to said voltage responsive switch means whereby said voltage responsive switch means remains conductive so long as the voltage of said monitored signal is below said predetermined maximum level,
 and means operatively connected to said controlled rectifier for sensing and indicating conduction by said controlled rectifier.

2. The voltage sensing and indicating circuit of claim 1 wherein said voltage responsive switch means is a zener diode operatively connected to said first and said second voltage divider networks and having a breakdown voltage which is exceeded by the resultant voltage from said voltage divider networks so long as the voltage of such monitored signal remains between said maximum and said minimum levels.

3. The voltage sensing and indicating circuit of claim 1 wherein said controlled rectifier is a silicon controlled rectifier and wherein said sensing means operatively connected to said controlled rectifier is a relay which is energized by conduction of said controlled rectifier.

4. The voltage sensing and indicating circuit of claim 1 wherein at least one of said voltage divider networks includes a potentiometer connected across said input terminals with its adjustable output tap operably connected to said voltage responsive switch means whereby the relative magnitude between the voltage across said input terminals and the voltage applied to said switch means through said tap may be manually adjusted.

5. The voltage sensing and indicating circuit of claim 1 wherein said sensing means operatively connected to said controlled rectifier is a relay having an energized and a non-energized position, whereby conduction by said controlled rectifier causes said relay to assume said energized position and non-conduction by said controlled rectifier causes said relay to assume said non-energized position, and which further includes an energy storage device operatively connected to said relay and to said controlled rectifier and charged by conduction by said controlled rectifier whereby, when said controlled rectifier ceases conduction, said energy storage device discharges through said relay to delay movement of said relay to its said non-energized position.

6. The voltage sensing and indicating circuit of claim 1 wherein at least one of said voltage divider networks includes temperature compensating means operatively connected to such voltage divider network whereby the ratio of the voltage across said input terminals to the voltage applied to said voltage responsive switch means remains constant throughout variations in ambient temperature.

7. A voltage sensing and indicating circuit for detecting and indicating when the voltage of a monitored signal exceeds a predetermined maximum or minimum level, said circuit comprising, in combination,
   a pair of input terminals for connection to the source of such monitored signal,
   a controlled rectifier having anode, cathode and gate electrodes,
   means operably connected to said controlled rectifier for sensing and indicating conduction thereby,
   a first zener diode operably connected to said gate electrode of said controlled rectifier with said controlled rectifier biased such that it will conduct when said zener diode is conducting,
   a first voltage divider network connected across said input terminals and to said first zener diode such that the resultant voltage applied to said first zener diode will exceed its breakdown voltage so long as the voltage of said monitored signal exceeds such predetermined minimum level,
   a second voltage divider network connected across said input terminals,
   a second zener diode operably connected to said second divider network such that the resultant voltage applied to said second zener diode will exceed its breakdown voltage if the voltage of such monitored signal exceeds such predetermined maximum level,
   a transistor having emitter, collector and base electrodes with the emitter, collector circuit operably connected to said first voltage divider network whereby conduction of such transistor will cause the resultant voltage applied to said first zener diode to drop below its breakdown voltage and with the base electrode of said transistor connected to said second zener diode whereby conduction by said second zener diode, when the voltage of such monitored signal exceeds such predetermined maximum value, will cause said transistor to conduct, thus causing said first zener diode to cease conduction, whereby said controlled rectifier is turned off.

8. The voltage sensing and indicating circuit of claim 7 wherein said sensing means operably connected to said controlled rectifier is a relay energized by conduction of said controlled rectifier.

References Cited by the Examiner

UNITED STATES PATENTS

| 3,170,088 | 2/1965 | Coutsourakis | 317—22 |
| 3,213,323 | 10/1965 | Circle | 317—33 |
| 3,214,641 | 10/1965 | Sonnemann | 317—36 |
| 3,243,796 | 3/1966 | Harmon | 317—33 X |

FOREIGN PATENTS 1,160,092  12/1963  Germany.

OTHER REFERENCES

IBM Technical Disclosure Bulletin, F. L. O'Malley, Voltage Detection Circuit, vol. 3, No. 6, November 1960, page 37.

MILTON O. HIRSHFIELD, *Primary Examiner.*

J. A. SILVERMAN, *Assistant Examiner.*